(12) United States Patent
Weeks (10) Patent No.: US 6,926,292 B1
(45) Date of Patent: Aug. 9, 2005

(54) CANOE CART

(76) Inventor: Kenneth Blair Weeks, 355 Parkwood Avenue, Bradford, Ontario (CA) L3Z 2W9

( * ) Notice: Subject to any disclaimer, the term of this patent is extended or adjusted under 35 U.S.C. 154(b) by 0 days.

(21) Appl. No.: 10/770,568

(22) Filed: Feb. 4, 2004

(51) Int. Cl.$^7$ ................................................ B62B 1/12
(52) U.S. Cl. ................ 280/47.331; 280/30; 280/47.21; 280/414.1; 280/47.18
(58) Field of Search ...................... 280/47.331, 47.131, 280/47.2, 47.21, 47.31, 30, 63, 414.1, 414.2, 280/47.3, 47.32, 47.33, 652, 651, 47.18, 280/47.26

(56) References Cited

U.S. PATENT DOCUMENTS

| | | |
|---|---|---|
| 2,533,895 A | 12/1950 | Raveau |
| 2,540,279 A | 2/1951 | Mosier |
| 2,622,893 A | 12/1952 | Wasserlein |
| 2,688,494 A | 9/1954 | Wilson |
| 2,970,846 A | 2/1961 | Boston |
| 3,046,034 A | 7/1962 | Herrick |
| 3,188,108 A | 6/1965 | Davis |
| 3,284,821 A | 11/1966 | Zoretic |
| 3,379,452 A | 4/1968 | Torrisi |
| 3,603,608 A | 9/1971 | Kirkpatrick |
| 3,986,723 A | 10/1976 | Brockelsby |
| 4,822,065 A | 4/1989 | Enders |
| 4,824,127 A | 4/1989 | Stamm |
| 4,936,595 A | 6/1990 | Cunningham |
| 5,072,959 A * | 12/1991 | Marullo ................. 280/47.331 |
| 5,106,113 A * | 4/1992 | Piacentini ................ 280/47.21 |
| 5,149,116 A * | 9/1992 | Donze et al. ............ 280/47.26 |
| 5,203,580 A | 4/1993 | Cunningham |
| 5,261,680 A | 11/1993 | Freitus et al. |
| 6,142,491 A * | 11/2000 | Darling, III ................. 280/30 |
| 6,142,492 A | 11/2000 | DeLucia |
| 6,164,671 A * | 12/2000 | Darling, III ................. 280/30 |
| 6,364,336 B1 | 4/2002 | Jenkins |
| 6,416,066 B1 | 7/2002 | Ciulis |
| 2001/0004148 A1 * | 6/2001 | Darling, III ................. 280/30 |

OTHER PUBLICATIONS

Hart Designs, The Products (and Soul) of Hart Designs, Inc., 2002-2003, pp. 1-2, Excelsior, MN.
Hart Designs, Portage Pal Carts, 2002-2003, p. 1, Excelsior, MN.
Paddleboy Designs LLC, Center Carts, 2003, pp. 1-2.
Spring Creek Design, Kayak/Canoe Cart, Date unknown, p. 1.
Oak Orchard Canoe and Kayak Experts, Boat Carts, Nov. 12, 2003, pp. 1-3.
Western Canoeing & Kayaking, Wheels & Carts, Date unknown, pp. 1-2.
North Woods Canoe Company Ltd., Canoe/Kayak carts, 1989, pp. 1-2, Cachrane, Canada.

* cited by examiner

Primary Examiner—J. Allen Shriver
(74) Attorney, Agent, or Firm—Bereksin & Parr (57) ABSTRACT

A cart for transporting a load has a frame having an upper end and a lower end, at least two laterally spaced apart support surfaces secured adjacent the upper end of the frame, and a pair of transversely opposed wheels adjacent the lower end of the frame to rollably support the frame above a surface. Each wheel is positionable in either one of two laterally offset positions relative to the support surface. In the first offset position, each wheel is positioned laterally inboard of the support surface, and in the second offset position, the wheel is positioned laterally outboard of the support surface.

22 Claims, 6 Drawing Sheets

VIEW "A"
FIG. 3

CANOE CART

FIELD OF THE INVENTION

The present invention relates to carts suitable for transporting, for example, canoes or other watercraft along portage trails.

BACKGROUND OF THE INVENTION

Moving boats, canoes, or other watercraft over land can be an awkward and difficult task. Carts for transporting watercraft over land are known in the prior art.

U.S. Pat. No. 3,284,821 discloses a wheel assembly for a boat that has a pair of retractable wheel units each of which are clamped to the gunwale of a boat and can be pivoted from a stowed position inside the boat to a deployed position wherein the wheels are generally under the boat. The wheel assemblies are shaped to follow the outer contour of the boat hull. Accordingly, different boat sizes and shapes may require custom-made wheel units.

U.S. Pat. No. 5,072,959 discloses a boat carrier that has a frame that is adjustable in width and height to accommodate a variety of boat sizes and shapes. The frame has uprights that are positioned outboard of the width of the boat, and wheels are positioned at the lower end of the uprights, laterally outboard of the uprights. According to this design, the wheels are spaced rather far apart, which can cause difficulty when negotiating narrow paths or trails. As well, a transverse beam extends between the uprights below the boat, which can reduce ground clearance.

SUMMARY OF THE INVENTION

The present invention provides a cart for transporting loads, such as, for example, but not limited to, canoes or other watercraft along portage trails. The cart is portable, collapsible, and can easily be stowed inside the watercraft when not in use. The cart has a single pair of transversely opposed wheels that can be positioned under the load centrally or at another convenient location, to facilitate manually maneuvering the load along the ground. The load can be balanced over the single pair of wheels of a single cart, or more than one cart can be used under a single load so that the load is stable and generally self-supported on the carts.

According to one aspect of the present invention, a cart for transporting canoes or other watercraft over land is provided. The cart has a frame with a pair of transversely opposed strut assemblies, and a wheel attached to each strut assembly for rollably supporting the frame above a surface. Each strut assembly is mountable to the frame in either one of two positions, the first position providing a wide track configuration, wherein each wheel is positioned laterally outboard of the respective strut assembly, and the second position providing a narrow track configuration, wherein each wheel is positioned laterally inboard of the respective strut assembly.

According to a second aspect of the invention, a cart for transporting a load is provided with a frame having an upper end and a lower end, at least two laterally spaced apart support surfaces secured adjacent the upper end of the frame, and a pair of transversely opposed wheels adjacent the lower end of the frame to rollably support the frame above a surface. Each wheel is positionable in either one of two laterally offset positions relative to the support surface. In the first offset position, each wheel is positioned laterally inboard of the support surface, and in the second offset position, each wheel is positioned laterally outboard of the support surface.

According to a third aspect of the invention, a kit pf parts for in-the-field assembly of a cart for transporting a load includes a pair of strut assemblies, each strut assembly having an upper support surface against which a load to be supported by the cart can bear and an axle for receiving a wheel for rollably supporting the cart on a surface. The kit of parts further includes a pair of cross bars adapted to be secured to and to extend between the strut assemblies, two wheels, one wheel for each of the axles, and frame assembly hardware for securing the cross bars to the strut assemblies.

BRIEF DESCRIPTION OF THE DRAWINGS

For a better understanding of the present invention and to show more clearly how it would be carried into effect, reference will now be made by way of example, to the accompanying drawings that show a preferred embodiment of the present invention, and in which.

DETAILED DESCRIPTION OF THE INVENTION

Figure 1:
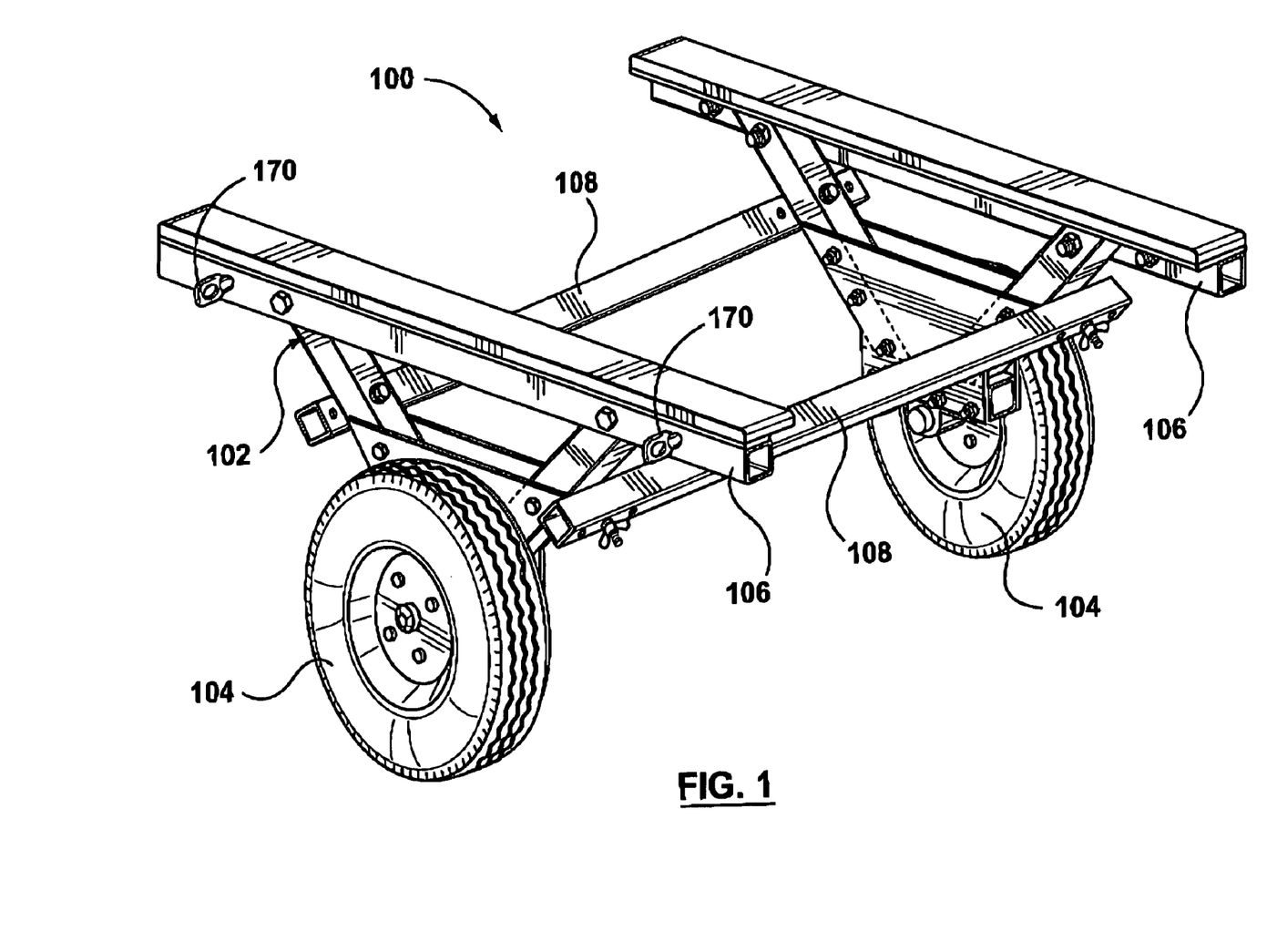
FIG. 1 is a perspective view of a cart according to one embodiment of the present invention.

A cart according to the present invention is shown generally at 100 in FIG. 1. The cart has frame 102 and wheels 104 attached to the frame 102. The frame 102 has a pair of strut assemblies 106 secured together in laterally spaced-apart relation by a pair of cross bars 108.

Figure 2:
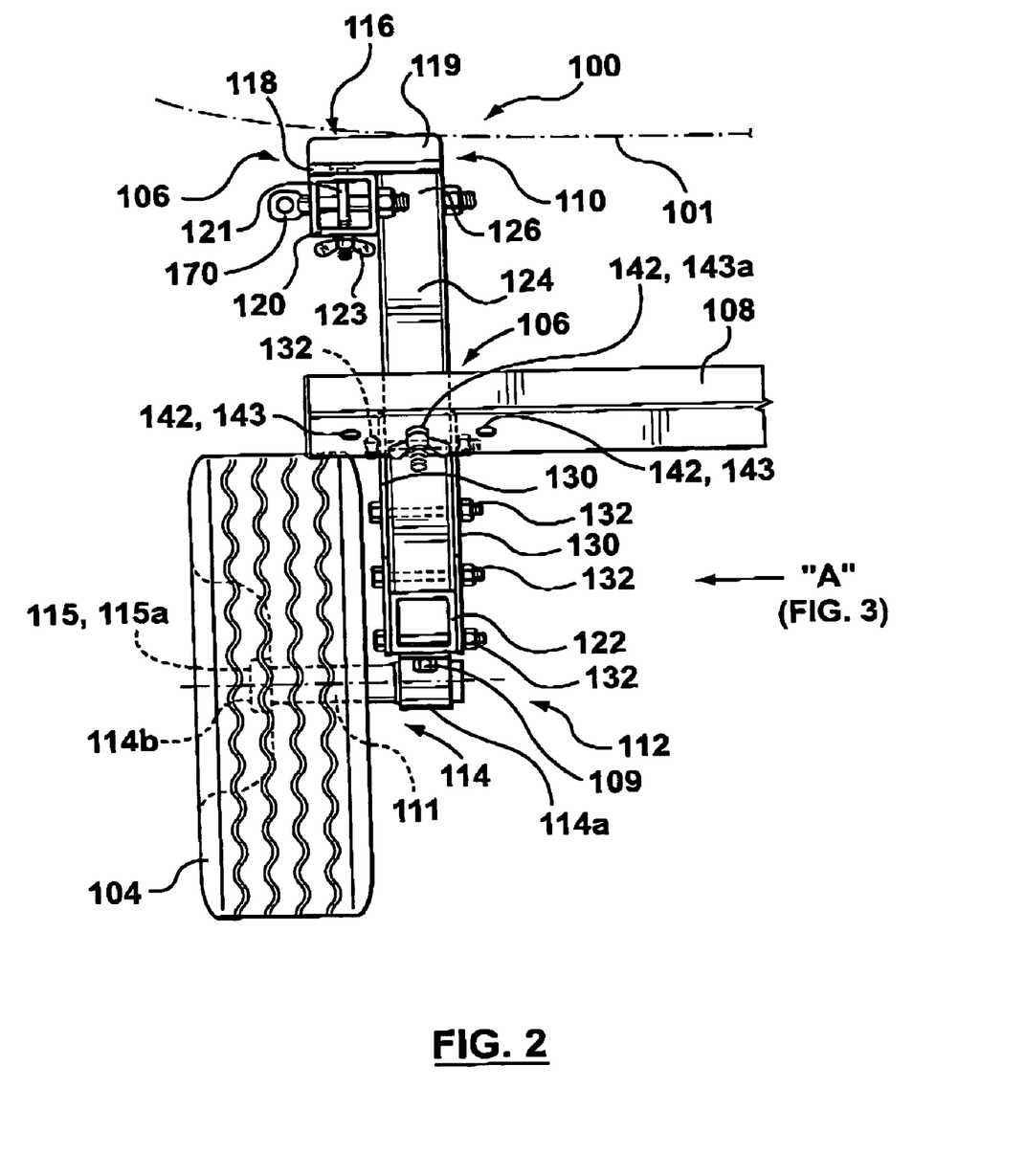
FIG. 2 is a front view of a portion of the cart of FIG. 1.
Figure 3:
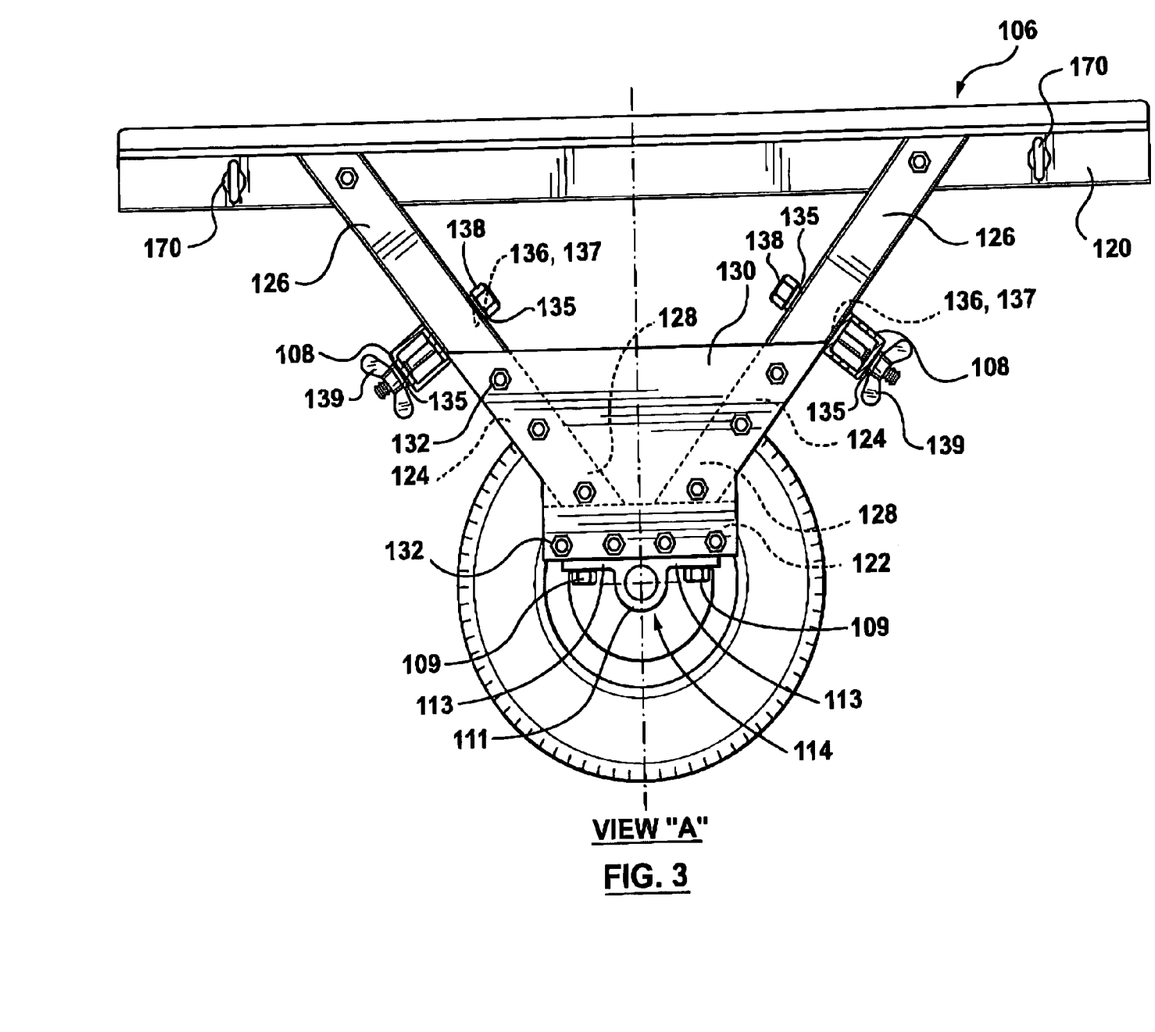
FIG. 3 is a side view of the portion of the cart of FIG. 2.

Referring to FIGS. 2 and 3, each strut assembly 106 has an upper end 110 and a lower end 112, and an axle 114 mounted adjacent the lower end 112. A wheel 104 is rotatably secured to the axle 114. The upper ends 110 of each strut assembly 106 are provided with support surfaces 116 against which a load 101, such as, for example, a canoe, supported by the cart 100 can bear.

Each strut assembly 106 comprises a framework of elongate members that are in general alignment with a vertical plane. Th strut assemblies 106 can thereby provide left and right side panels of the cart 100. In the embodiment illustrated, each strut assembly 106 has an upper member 120, a lower member 122 that is aligned generally parallel to the upper member 120, and a pair of diagonal braces 124 that converge from the upper member 120 to the lower member 122. In the embodiment illustrated, the upper member 120, lower member 122, and the diagonal braces 124 are constructed of aluminum square tubing. This material can be advantageous because it is resistant to the elements and is strong but lightweight. Other suitable materials can also be used, such as, for example, but not limited to, steel or wood.

In the embodiment illustrated, a separate axle 114 is secured to the lower member 122 of each of the strut assemblies 106. Each axle 114 can comprise a relatively short rod member 111 having opposed transversely extending flanges 113 at one end of the rod member. The flanges 113 are bolted to the underside of the lower member 122 by bolts 109, providing a fixed end 114*a* of the axle 114. The end of the axle 114a opposite the fixed end 114a provides a free end 114b. The free end 114b of each axle 114 can be provided with an internally threaded bore for receiving a bolt 115 with washers 115 (flat washers 115a and lock washers 115b) to secure the wheel 104 to the axle 114.

The support surface 116 is provided adjacent the upper end 110 of each strut assembly 106. In the embodiment illustrated, the support surface 116 comprises a flat bar 118 having a protective strip 119 along its upper surface and mounted to the upper surface of the upper member 120. The flat bar 118 can be secured to the upper member 120 by bolts 121 and wing nuts 123. The flat bar can be of aluminum, having a width sufficient to span the width of the upper surface of the upper member 120 and the width of the upper ends of the diagonal members 124. The protective strip 119 can be a strip of rubber, and can be relatively porous to enhance the gripping characteristics of the strip 119 against the load 101. The protective strip 119 can be secured to the upper surface of the bar 118 by means of an adhesive.

The diagonal braces 124 have upper ends 126 that are secured to the upper member 120. In the embodiment illustrated, the upper ends 126 of the diagonal braces 124 are bolted to a side surface of the upper member 120 by bolts 127. The diagonal braces 124 have lower ends 128 that are secured to the lower member 122. In the embodiment illustrated, the lower member 122 is positioned immediately below the diagonal braces 124, to abut the end faces of the lower ends 128 of the diagonal braces 124. The lower member 122 can be secured to the diagonal braces 124 by means of a pair of gusset plates 130 that are provided on either side of the diagonal braces 124, sandwiching the lower ends 128 of the diagonal braces 124 and the lower member 122. A series of bolts 132 are provided through the gusset plates 132 and the diagonal braces 124 and through the gusset plates 130 and the lower member 122.

The diagonal braces 124 each have strut attachment means 136 for securing the strut assemblies 106 to the cross bars 108. In the embodiment illustrated, the attachment means 136 is provided in the form of a mounting hole 137 through which a bolt 138 can be inserted to secure the diagonal braces 124 and the strut assemblies 106 together. Flat washers 135a, lock washers 135b, and wing nuts 139 can be used with the bolts 138 to secure the braces 124 and strut assemblies 106 together. The mounting hole 137 is located at an intermediate position along the length of the diagonal brace 124, between the upper end 126 and lower end 128. The mounting hole 137 is located far enough away from the lower end 128 to provide clearance between the cross bars 108 and the wheels 104.

The cross bars 108 are provided with bar attachment means 142 to cooperate with the strut attachment means 136 for securing the strut assemblies 106 to the cross bars 108. In the embodiment illustrated, the bar attachment means 142 comprises a hole 143a through which the bolt 138 can extend. The cross bars 108 can be lengths of aluminum square tubing. The lengths of the cross bars 108 can be selected to be wide enough to satisfactorily support a desired load, yet narrow enough to facilitate ease of storage and/or transport of the cross bars 108 when not in use. In the embodiment illustrated, the length of the cross bars 108 is about 425 to 475 cm. Extended length cross bars 108 can be provided, having a length of about 600 to 650 cm. Gross bars 108 having other suitable lengths can also be provided.

Rather than providing only a single hole 143a at either end of the cross bars 108, a plurality of holes 143 can be provided so that the spacing between the strut assemblies 106 can be adjusted. This can facilitate spacing apart the support surfaces 116 an appropriate distance to best accommodate the width and/or lower profile of any particular load 101 being carried by the cart 100. As the width between the strut assemblies 106 is increased or decreased by selecting specific holes 143a spaced further apart or closer together, the spacing between the strut assemblies 106 is correspondingly increased or decreased, thereby adjusting the spacing between the support surfaces 116.

In some cases it may be desirable to adjust the spacing between the wheels 104 without making an equal and corresponding change to the spacing of the support surfaces 116. Such capability could, for example, facilitate transport of relatively wide load along relatively narrow paths.

According to the present invention, the strut assemblies 106 provide a reversible offset wheel mounting structure for securing the wheels 104 to the frame 102 of the cart 100 in either one of a wide track configuration 150 or narrow track configuration 152. This can be best understood with reference to FIG. 4. The wide track configuration 150 of the wheel positioning is shown in solid lines, and the narrow track configuration 152 of the wheel positioning is shown in phantom.

Referring again to FIG. 4, each strut assembly 106 has attached to it a wheel 104 and a support surface 116. The position of the wheel 104 mounted to the strut assembly 106 is laterally offset from the support surface 116, this distance defining a wheel offset distance 154. The wheel offset distance 154 can be measured from a wheel reference plane 156, which is defined to extend vertically through the midpoint of the wheel 104 (parallel to and equidistant from the inner and outer faces of the wheel), to the longitudinally extending centerline 158 of the support surface 116, in a direction perpendicular to the wheel reference plane 156. The wheel offset distance 154 can be a distance of, for example, but not limited to, from about 5 cm to about 50 cm or more. In the embodiment illustrated, the offset distance 154 is about 10 cm.

Figure 4:
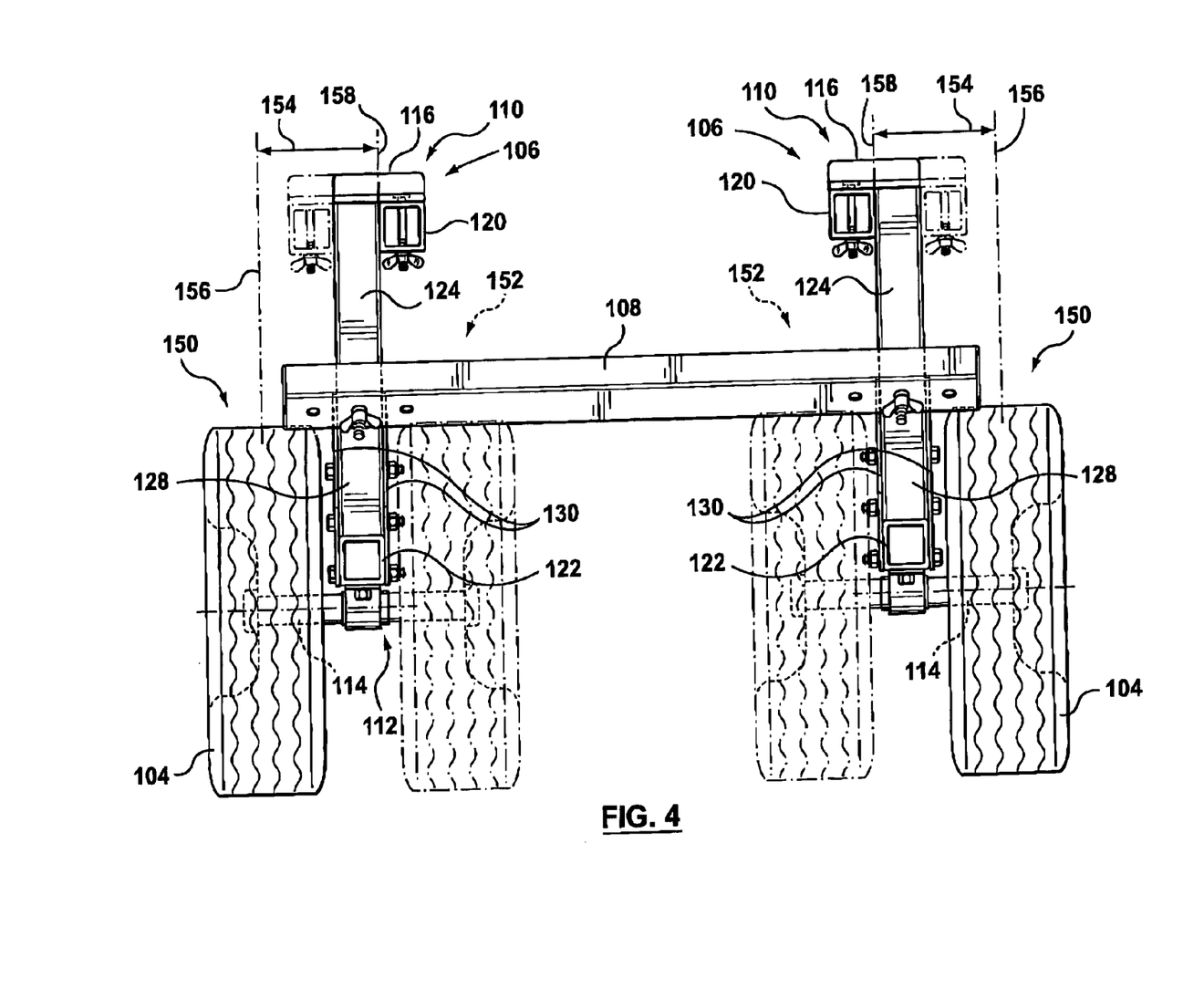
FIG. 4 is a front view of the cart of FIG. 1.

The strut assemblies 106 can be mounted to the cross bars 108 in either one of two positions, namely, with the free ends 114b of the axles 114 directed outward so that the wheels 104 are positioned generally outboard (laterally outwardly) of the strut assemblies 106, or with the free ends 114b of the axles 114 directed inward so that the wheels 104 are positioned generally inboard (laterally inwardly) of the strut assemblies 106. The outboard wheel positioning corresponds to the wide track configuration 150, and the inboard wheel positioning corresponds to the narrow track configuration 152. Therefore, by reversing the mounting of the strut assemblies 106, the cart 100 can provide a narrower wheel spacing or a broader wheel spacing, relatively independently of the spacing provided between the support surfaces 116.

It is to be understood that some change to the spacing between the support surfaces 116 may result from reversal of the strut assemblies 106 between the wide 150 and narrow 152 track configurations. In particular, where the width of the support surface 116 of a strut assembly 106 is asymmetrically disposed about the strut mounting means, reversal of the strut assembly 106 will cause a lateral shift in the position of the support surface 116 that corresponds to the degree of asymmetry. However, reverse mounting the strut assemblies 106 having the wheel offset will permit adjustment of the spacing between the wheels 104 without making an equal and corresponding change to the spacing of the support surfaces 116.

In the embodiment illustrated, the width of the support surface 116 is asymmetrically disposed about the strut mounting means 137. Furthermore, the width of the support surface 116 is asymmetrically disposed about the bolts 121 for securing the flat bar 118 to the upper member 120. This can provide additional adjustment of the spacing between the support surfaces 116, independent of the spacing between the wheels 104, by releasing the wing nuts 123 and reattaching the pad 116 in a laterally reversed position.

Figure 5:
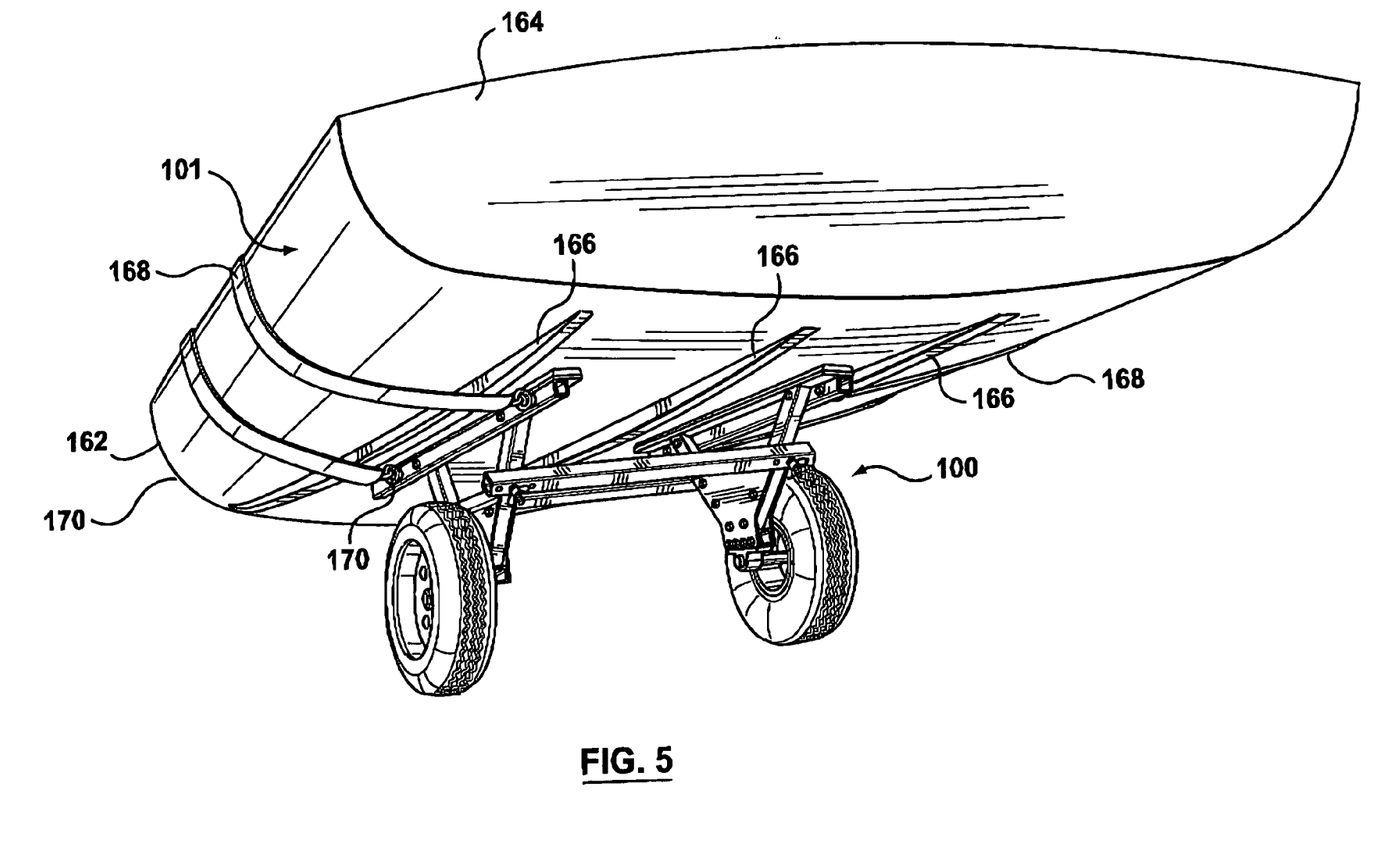
FIG. 5 is perspective view of the cart of FIG. 1 shown in combination with a boat being carried by the cart.

Referring now to FIG. 5, the cart 100 can be seen in use to transport a boat 101. The cart 100 is positioned at an intermediate position between the bow 162 and stem 164 of the boat 101, and the support surfaces 116 are spaced apart to balance the width of the boat 101 and avoid the strakes 166 along the hull. The weight of the boat 101 can be generally balanced over the wheels 104 of the cart 100, to facilitate ease and safety of manually rolling the cart 100 with the boat 101 along the ground. The separate axles 114 for each wheel 104 provide improved ground clearance between the wheels 104 (compared to a continuous axle design with an axle extending between the wheels), which can facilitate traveling over rocks or other obstructions one may encounter along a path. In the example of FIG. 5, a strap 168 is provided for securing the boat to the cart 100. To facilitate attachment of the strap 168, the frame 102 of the cart 100 can be provided with eyes 170 or other anchoring devices.

Figure 6:
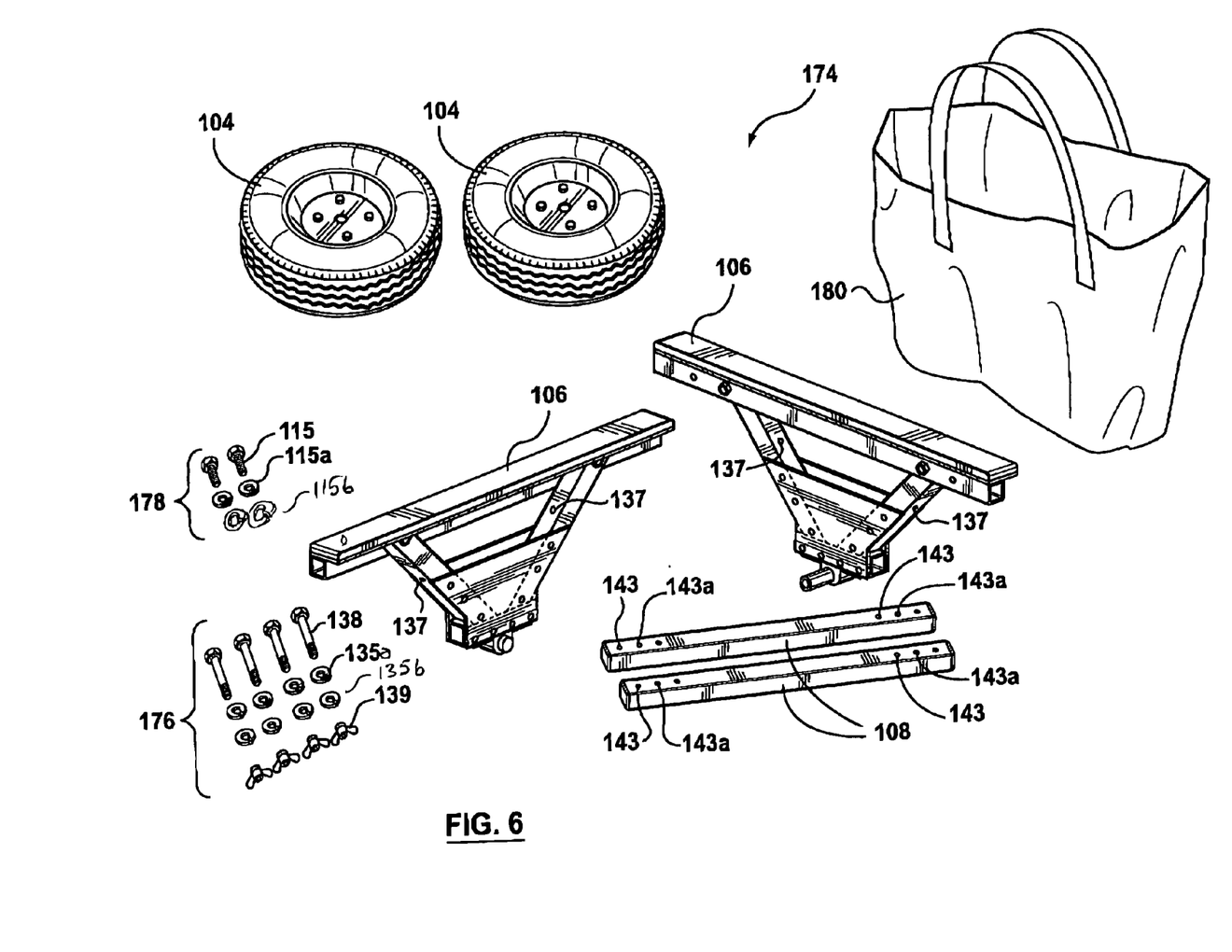
FIG. 6 is a perspective view of a kit of parts from which the cart of FIG. 1 can be assembled.

Referring now to FIG. 6, the present invention comprehends providing a kit of parts 174 from which the cart 100 can be assembled. The kit of parts 174 can be lightweight and easily stowed for transport with minimal space consumption. To facilitate in-the-field assembly, some of the parts in the kit of parts 174 can be provided in a pre-assembled form.

According to one embodiment, the kit of parts 174 includes two strut assemblies 106, two cross bars 108, and two wheels 104. Each strut assembly 106 is provided in a pre-assembled condition. The kit of parts further includes frame assembly hardware 176 for securing the strut assemblies 106 to the cross bars 108, and wheel assembly hardware 178 for securing the wheels 104 to the strut assemblies 106. The frame assembly hardware 176 can include four bolts 138, four wing nuts 139, four flat washers 135*a*, and four lock washers 135*b*. The wheel assembly hardware 178 can include two bolts 115, two flat washers 115*a*, and two lock washers 115*b*. The frame assembly hardware 176 and the wheel assembly hardware 178 can be of stainless steel material to resist damage from exposure to the elements. The kit of parts 174 can include a tote bag 180 for containing the kit of parts 174. The tote bag 180 can be constructed of any suitable material, such as, for example, canvas material.

To use the kit of parts 174, the strut assemblies 106 can be secured to the cross bars 108 by aligning the mounting holes 137 of the strut assemblies 106 with selected ones 143*a* of the holes 143 in the cross bars 108. The selected holes 143*a* can be chosen to space apart the support surfaces 116 as appropriate to accommodate the load 101 to be carried. The strut assemblies 106 can be oriented with the wheels 104 facing outward from the frame 102 or facing inward towards the frame 102, to provide a wider wheel spacing (wider track configuration 150) or narrower wheel spacing (narrower track configuration 152) as desired. The bolts 138 can be inserted through the holes 137, 143*a*, and the washers 135 and wing nuts 139 can be installed to tighten the joints together. The wheels 104 can then be secured to the axles using the wheel mounting hardware 178.

While preferred embodiments of the invention have been described herein in detail, it is to be understood that this description is by way of example only, and is not intended to be limiting. The full scope of the invention is to be determined from reference to the appended claims.

For example, the present invention comprehends that in some embodiments, the wheel offset may be provided by other means, including, for example, but not limited to, reversal of the axles 114 themselves, rather than reversal of the entire strut assemblies 106 relative to the cross bars 108. In other words, referring to FIG. 2, the bolts 109 could be loosened, and the axle 114 removed and reattached with its free end 114*b* directed inwardly (to the right in FIG. 2). The bolts 109 could be tightened with wing nuts to facilitate this process.

In some embodiments, the strut mounting structure may comprise short lengths of threaded rod welded or otherwise secured to the diagonals (in place of using separate bolts 138) so as to cooperate with the holes 143 provided in the cross bar 108. This can facilitate assembly, and can reduce the amount of loose hardware provided in the kit of parts.

What is claimed is:

1. A cart for transporting a load, the cart comprising:
   a) a frame having a left and a right strut assembly, each strut assembly including:
      i) a respective support surface secured to a respective one of the strut assemblies adjacent an upper end thereof and adapted to bear against a load carried by the cart; and
      ii) a respective axle secured to a respective one of the strut assemblies adjacent a lower end thereof; and
   b) a wheel mounted on each respective axle, each wheel being laterally offset from the respective support surface;
   each strut assembly adapted to be separately attachable to the frame in either one of an outboard and an inboard offset position;
   the outboard offset position providing the wheel laterally outboard of the respective support surface; and
   the inboard offset position providing the wheel laterally inboard of the respective support surface.

2. The cart according to claim 1 wherein each axle is relatively short, having a fixed end secured to the strut assembly and a free end spaced apart from the fixed end by a distance approximately equal to the lateral extent of the wheel received on each axle.

3. The cart according to claim 2 wherein, in the wide track configuration outboard offset position, the free ends of the axles are directed outwardly away from each other, and in the narrow track configuration inboard offset position, the free ends of the axles are directed inwardly towards each other.

4. The cart according to claim 1, wherein the frame further comprises at least one cross bar attached to and extending between the left and right strut assemblies.

5. The cart according to claim 4, wherein the at least one cross bar is adapted to provide adjustable spacing between the left and right strut assemblies.

6. The cart according to claim 5, wherein the at least one cross bar has a plurality of laterally spaced apart holes for selectively receiving a fastener to secure one of the strut assemblies to the at least one cross bar.

7. The cart according to claim 4, wherein each strut assembly further comprises a pair of diagonal braces including a forward diagonal brace and a rearward diagonal brace, the forward and rearward diagonal braces each extending between the upper support surface and the axle, and the diagonal braces converging towards each other, being broadly spaced proximate the support surface and narrowly spaced proximate the axle.

8. The cart according to claim 7, wherein the at least one cross bar is attached to and extends between a diagonal brace of the left strut assembly and a diagonal brace of the right strut assembly.

9. The cart according to claim 7, further comprising a forward cross bar and a rearward cross bar.

10. The cart according to claim 9, wherein the forward cross bar is attached to and extends between the forward diagonal braces of the left and right strut assemblies, and the rearward cross bar is attached to and extends between the rearward diagonal braces of the left and right strut assemblies.

11. The cart according to claim 10 wherein the point of attachment of the cross bars along the diagonal braces is spaced away sufficiently from the respective axles to provide clearance to accommodate each wheel in both the inboard and outboard offset positions of the strut assemblies.

12. A kit of parts for in-the-field assembly of a cart for transporting a load, the kit of parts comprising:
   a) a left and a right strut assembly, each strut assembly including a respective upper support surface against which a load to be supported by the cart can bear, and a respective axle secured to a respective one of the strut assemblies adjacent a lower end therefore for receiving a wheel;
   b) at least one cross bar adapted to be secured to and extend between the strut assemblies;
   c) two wheels, one wheel for each of the axles, each wheel being laterally offset from the respective support surface when mounted on the axle of a respective strut assembly; and
   d) frame assembly hardware for securing the strut assemblies to the at least one cross bar, each strut assembly adapted to be separately attachable to the at least one cross bar in either one of an outboard and an inboard offset position;
   the outboard offset position providing the respective wheel laterally outboard of the respective support surface; and
   the inboard offset position providing the respective wheel laterally inboard of the respective support surface.

13. The kit of parts according to claim 12 wherein the frame assembly hardware comprises wing nuts to facilitate hand-assembly of the cart.

14. The kit of parts according to claim 12 further comprising wheel assembly hardware for securing the wheels to the axles.

15. The kit of parts according to claim 12 further comprising a tote bag for containing the kit of parts.

16. The kit of parts according to claim 12 wherein the at least one cross bar is adapted to provide adjustable spacing between the left and right strut assemblies.

17. The kit of parts according to claim 16, wherein the at least one cross bar has a plurality of laterally spaced apart holes for selectively receiving a fastener to secure one of the strut assemblies to the at least one cross bar.

18. The kit of parts according to claim 12, wherein each strut assembly further comprises a pair of diagonal braces including a forward diagonal brace and a rearward diagonal brace, the forward and rearward diagonal braces each extending between the upper support surface and the axle of a respective one of the strut assemblies, and the diagonal braces converging towards each other, being broadly spaced proximate the upper support surface and narrowly spaced proximate the axle.

19. The kit of parts according to claim 18, wherein the at least one cross bar is attached to and extends between a diagonal brace of the left strut assembly and a diagonal brace of the right strut assembly.

20. The kit of parts according to claim 18, comprising a forward cross bar and a rearward cross bar.

21. The kit of parts according to claim 20, wherein the forward cross bar is attached to and extends between the forward diagonal braces of the left and right strut assemblies, and the rearward cross bar is attached to and extends between the rearward diagonal braces of the left and right strut assemblies.

22. The kit of parts according to claim 21 wherein the front-to-back spacing between the forward and rearward cross bars provides clearance to accommodate each wheel in both the inboard and outboard offset positions of the strut assemblies.

* * * * *